June 19, 1928.

T. C. RATHBONE

VIBROSCOPE

Filed June 9, 1924

1,673,949

2 Sheets-Sheet 1

WITNESSES:

T. C. Rathbone
INVENTOR

BY
ATTORNEY

June 19, 1928.

T. C. RATHBONE

VIBROSCOPE

Filed June 9, 1924

1,673,949

2 Sheets-Sheet 2

WITNESSES:

T. C. Rathbone
INVENTOR

BY
ATTORNEY

Patented June 19, 1928.

1,673,949

UNITED STATES PATENT OFFICE.

THOMAS C. RATHBONE, OF RIDLEY PARK, PENNSYLVANIA, ASSIGNOR TO WESTINGHOUSE ELECTRIC & MANUFACTURING COMPANY, A CORPORATION OF PENNSYLVANIA.

VIBROSCOPE.

Application filed June 9, 1924. Serial No. 718,988.

My invention relates to vibroscopes and it has for an object to provide apparatus of the character designated which shall be capable of accurately indicating the amplitude of vibration of a body oscillating or vibrating from any cause. It has for a further object to provide a device of the above character which may be easily secured to any vibrating apparatus and which may be constructed at very little cost.

Figure 1:
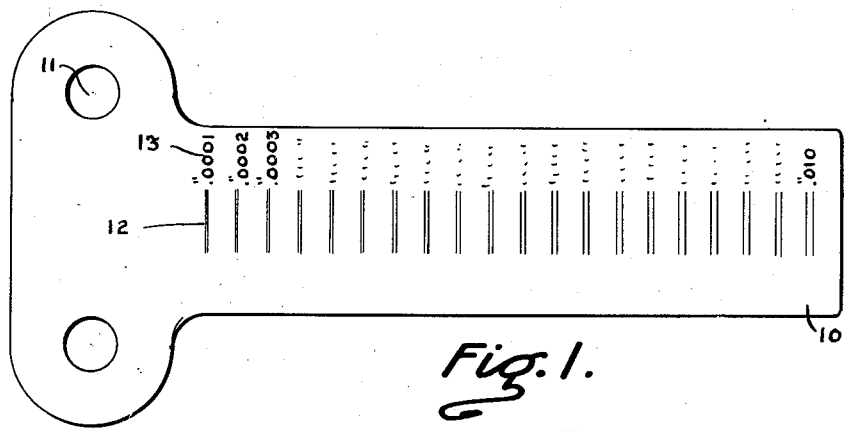
Figure 2:
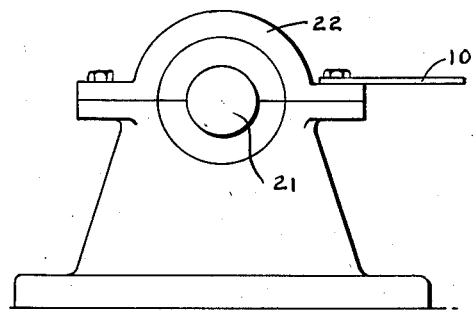
Figure 3:
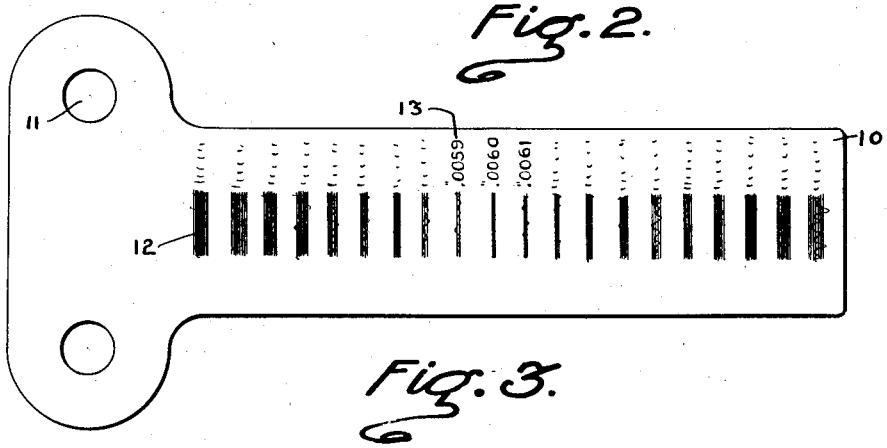
Figure 4:
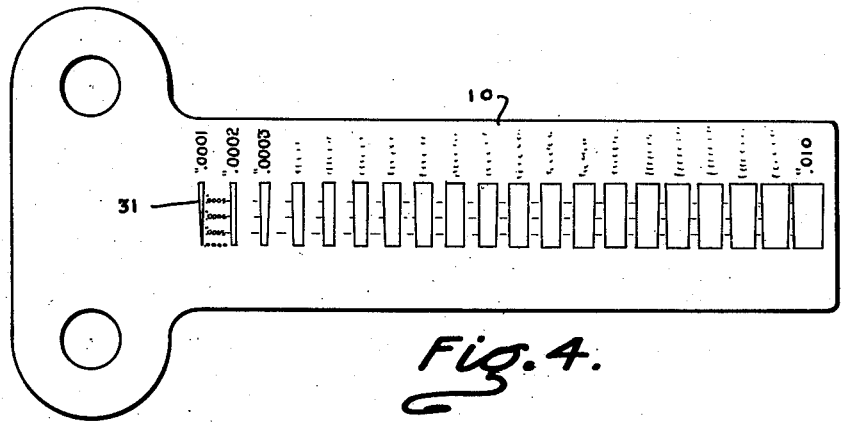
Figure 5:
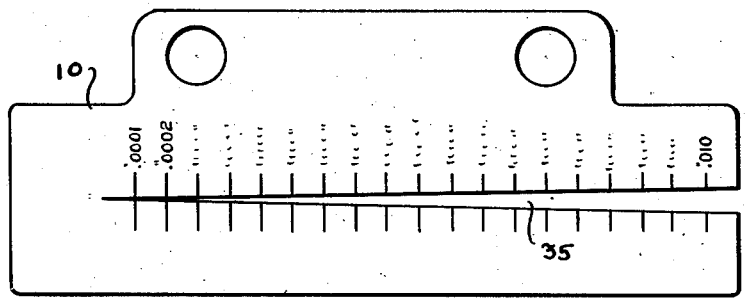
Figure 6:
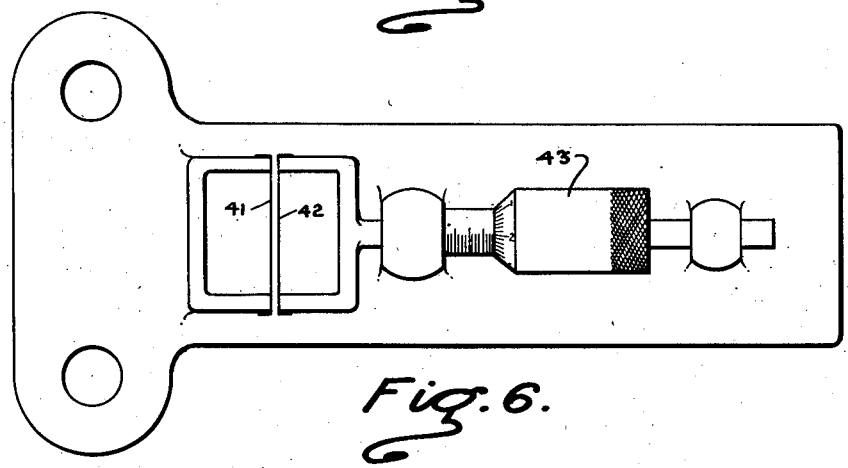

Referring to the drawings for a description of my invention, I show in Fig. 1, a view in elevation of one form of my vibroscope; Fig. 2 illustrates a method of securing the vibroscope to the bearing of a rotating body; Fig. 3 is an illustration of the appearance of the vibroscope shown in Fig. 1 when vibrated; and Figs. 4, 5 and 6 are views in elevation of different embodiments of my invention.

Referring to Fig. 1, I show a vibroscope 10 provided with suitable means 11 for attaching the same to the bearing of a rotating body. As illustrated, one surface of the vibroscope is provided with indicia, here shown as a plurality of pairs of lines 12, the lines comprising each pair being spaced at progressively increasing distances, the extent of the spacing being indicated at 13. These distances may, if desired, vary from .0001 to .010 inches, the scale being formed by assembling sheets of some suitable metal in pairs and spacing the sheets of each pair at successively greater distances.

The method of securing the vibroscope 10 to a vibrating body is illustrated in Fig. 2 in which I show a rotating shaft 21 supported in a bearing 22. The maximum amount of vibration being substantially in a horizontal plane, the vibroscope 10 is rigidly secured to the body with its inscribed lines arranged normal to the direction of vibration.

In operation, the appearance of the vibroscope is similar to that shown in Fig. 3. The property of visual retention of persistence of vision results in all lines becoming blurred except the ones which are separated by a distance equal to the amplitude of vibration. These two lines become superimposed and persist on the retina as one line, and by noting the corresponding measurement indicated directly above this pair of lines, a true index of the vibration may be ascertained. While I have described my invention as being a separate element adapted to be secured to a vibrating body, it is to be understood that I may form it integrally therewith, without departing from the spirit of my invention.

In Fig. 4 I illustrate another embodiment of my invention, which is provided with means for obtaining vernier readings. In this embodiment, the lines 31 comprising each pair, are inclined toward each other, and the coincidence resulting from vibration shows as a spot, the location of the spot along the line being an indication of a fractional part of the vibration represented by that pair of lines.

Fig. 5 shows another embodiment of my invention in which a V-shaped slot is provided in the vibroscope 10, the width of the slot increasing from its apex and representing vibrations of progressively greater amplitude. Upon this device being vibrated by a rotating body in a plane substantially normal to the slot, the edges of the slot assume a closed appearance, the location of the point of intersection being an indication of the amplitude of vibration.

In Fig. 6 I show an embodiment somewhat similar to that illustrated in Fig. 1 but which embodiment is provided with a micrometer attachment. The indicia comprise a fixed hair 41 and a movable hair 42, the position of the latter being controlled by a micrometer mechanism 43 of any well-known construction. By so adjusting the relative positions of the hairs that they appear as superimposed from the vibrations of the rotating body, the amplitude of vibration may be readily ascertained by the setting of the micrometer.

From the above description, it is apparent that I have invented a novel device for accurately ascertaining the amplitude of vibration of a body oscillating or vibrating from any cause. Attention is also invited to the fact that my device may be employed to determine the direction or plane of maximum vibration where the latter is not known. The device is simply constructed, occupies a minimum amount of space and includes no moving or wearing parts. Furthermore, the accuracy of results obtained are not affected by continual usage for extended periods of time.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. A vibroscope comprising an element capable of vibration having pairs of lines disposed substantially normal to the direction of vibration, the spaces intervening between the lines of the respective pairs representing different amplitudes of vibration.

2. A vibroscope comprising an element adapted to be secured to a vibrating body and having inscribed thereon pairs of lines, the lines composing each pair being spaced at progressively increasing distances and being substantially normal to the direction of vibration.

3. A vibroscope comprising an element for attachment to a vibrating body, said vibroscope having inscribed thereon pairs of diverging lines which extend transversely to the direction of vibration, the progressively increasing distances intervening between the lines of each pair corresponding to vibrations of different amplitudes.

4. The method of determining the amplitude of vibration of a body consisting of graphically representing different amplitudes of vibration by pairs of lines extending transversely to the direction of vibration, the lines comprising the respective pairs being spaced at progressively increasing distances; and vibrating the graphic representation in synchronism with the body.

5. A vibroscope comprising an element capable of vibration and bearing spaced lines representing different amplitudes of vibration, said lines extending transversely of the direction of vibration.

6. A vibroscope comprising an element capable of vibration and bearing lines spaced at progressively increasing distances for indicating progressively increasing amplitudes of vibration, said lines extending transversely to the direction of vibration.

7. A vibroscope comprising an element capable of vibration and bearing lines spaced in pairs, the lines of each pair being spaced at progressively increasing distances with respect to the lines of the preceding pair for representing progressively increasing amplitudes of vibration, all of said lines extending transversely of the direction of vibration.

8. The method of determining the amplitude of vibration of a body which consists in graphically representing different amplitudes of vibration by means of lines extending transversely to the direction of vibration and vibrating the graph in synchronism with the body.

9. The method of determining the amplitude of vibration of a body which consists in causing lines indicating an amplitude of vibration and extending transversely of the direction of vibration to vibrate in response to vibrations of the body.

10. The method of determining the amplitude of vibration of a body which consists in causing lines indicating a plurality of amplitudes of vibration and extending transversely of the direction of vibration to vibrate in response to vibrations of the body and observing whether any of the lines appear superimposed.

11. A vibroscope comprising an element adapted for attachment to a vibratory body and bearing lines spaced to indicate an amplitude of vibration, said lines being adapted to appear superimposed when said element receives vibrations transversely thereof and of an amplitude corresponding to the distance therebetween.

12. A vibroscope comprising an element adapted for attachment to a vibratory body and bearing lines spaced to indicate a plurality of amplitudes of vibration, whereby said lines may produce a visual indication by appearing superimposed at points where the space between the lines corresponds to the amplitude of vibrations transmitted to said element transversely of said lines.

13. A vibroscope comprising an element adapted for attachment to a vibratory body and bearing lines spaced to indicate an amplitude of vibration, said lines being adapted to appear superimposed when vibrations are transmitted to said element in a direction other than in the direction of the length of said lines.

In testimony whereof, I have hereunto subscribed my name this 21st day of May 1924.

THOMAS C. RATHBONE.